United States Patent [19]

Furusawa et al.

[11] 4,389,086

[45] Jun. 21, 1983

[54] FEEDTHROUGH TERMINAL COMPRISING A GUIDE MEMBER DEFINED FOR AT LEAST ONE OPTICAL FIBER CABLE BETWEEN A TUBE AND A ROD

[75] Inventors: Kahei Furusawa; Yoshihiro Ejiri; Yoshihiko Yamazaki; Tadayoshi Matsuzaki; Hiroyuki Nakashima; Osamu Harada, all of Tokyo, Japan

[73] Assignees: Kokusai Denshin Denwa Co., Ltd.; Nippon Electric Co., Ltd., both of Tokyo, Japan

[21] Appl. No.: 261,910

[22] Filed: May 8, 1981

[30] Foreign Application Priority Data

May 12, 1980 [JP] Japan .................................. 55-62644

[51] Int. Cl.³ .......................... G02B 5/14; H01L 33/00
[52] U.S. Cl. .................................................. 350/96.20
[58] Field of Search ........................... 350/96.20, 96.21

[56] References Cited

U.S. PATENT DOCUMENTS 4,119,363 10/1978 Camlibel et al. ................. 350/96.20
4,339,171 7/1982 Makuch et al. .................. 350/96.20

FOREIGN PATENT DOCUMENTS 2078995 1/1982 United Kingdom ............. 350/96.20

*Primary Examiner*—David K. Moore
*Attorney, Agent, or Firm*—Laff, Whitesel, Conte & Saret

[57] ABSTRACT

A feedthrough terminal for optical fiber cables (12), particularly for use in an underwater repeater, comprises a rod (22) received snugly in a tube (21) and having grooves (24), which are filled by a mass of solder (26) with the optical fiber cables placed in the respective grooves. The grooves may be formed along the tube inside surface or on opposing portion of the tube and the rod. The tube and/or the rod may be possessed of a recessed surface to provide a gap for the solder mass.

8 Claims, 10 Drawing Figures

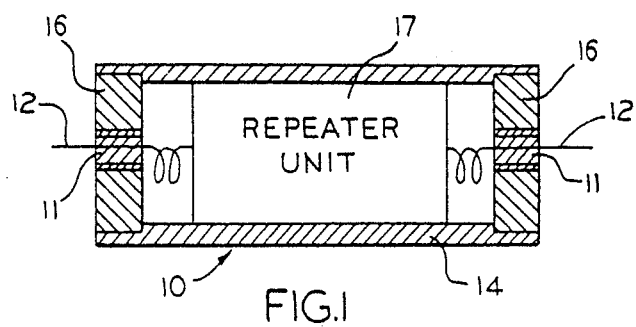
FIG.1 (PRIOR ART)
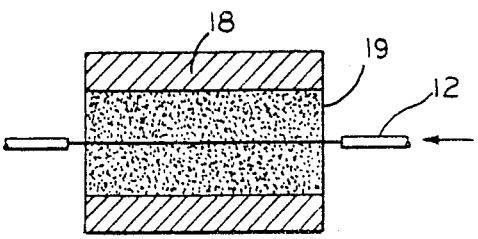
FIG.2 (PRIOR ART)
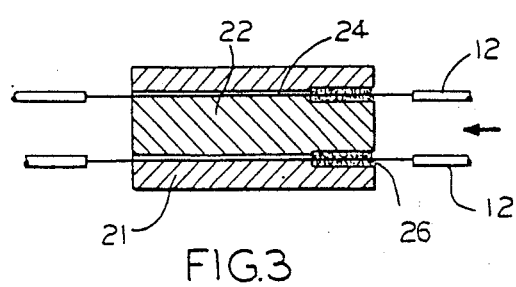
FIG.3
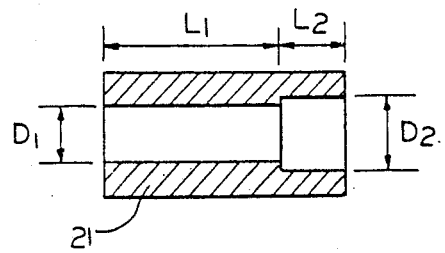
FIG.4
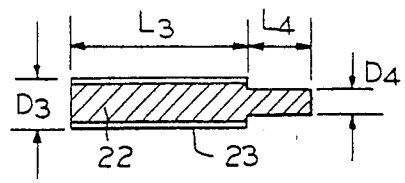
FIG.6
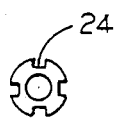
FIG.7
FIG.5
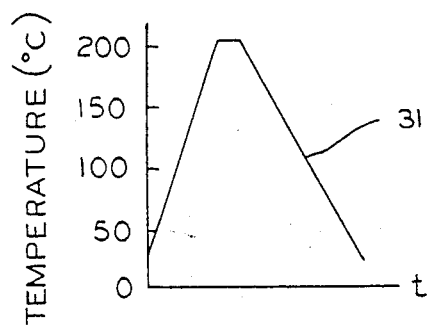
FIG.8
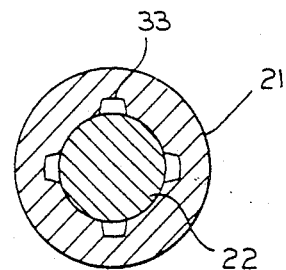
FIG.10
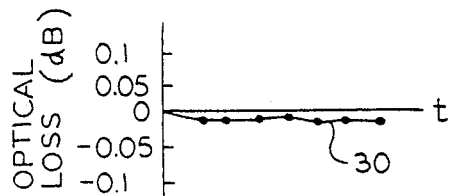
FIG.9

FEEDTHROUGH TERMINAL COMPRISING A GUIDE MEMBER DEFINED FOR AT LEAST ONE OPTICAL FIBER CABLE BETWEEN A TUBE AND A ROD

BACKGROUND OF THE INVENTION

This invention relates to a feedthrough terminal for optical transmission and, more particularly, a feedthrough terminal to be coupled to a submarine or underwater repeater.

A feedthrough terminal of the type described is used to support an optical fiber cable connected to a submarine or underwater repeater. Such a feedthrough terminal should have desirable watertightness and airtightness to protect the repeater from being deteriorated by humidity.

With a conventional feedthrough terminal, an optical fiber cable should be processed and coated with a metal coating layer under strict conditions and with great care to provide uniform watertightness and airtightness, as will later be described with reference to a few figures of the accompanying drawing. With an increase in number of optical fiber cables supported by the feedthrough terminal, it becomes difficult to position the optical fiber cables in the feedthrough terminal with precise spacings left between the cables.

SUMMARY OF THE INVENTION

It is, therefore, an object of this invention to provide a feedthrough terminal which exhibits desirable watertightness and airtightness even when an optical fiber cable is not processed before it is assembled on the feedthrough terminal.

It is another object of this invention to provide a feedthrough terminal of the type described, which is capable of readily coping with an increase in number of the optical fiber cables.

It is still another object of this invention to provide a feedthrough terminal of the type described, wherein optical fiber cables are located with precise spacings left therebetween even when the optical fiber cables are increased in number.

A feedthrough terminal to which this invention is applicable is for tightly supporting at least one optical fiber cable having a predetermined optical characteristic therethrough. According to this invention, the feedthrough terminal comprises a tube of a first metal having an inside cylindrical surface defining a cylindrical hollow space. The first metal has a first thermal expansion coefficient. The terminal comprises a rod of a second metal having an outside cylindrical surface and received snugly in the cylindrical hollow space with an interface provided by the inside and the outside cylindrical surfaces. The second metal has a second thermal expansion coefficient less than the first thermal expansion coefficient. The terminal further comprises guide means for guiding the optical fiber cable along the interface with a gap left around at least a portion of the optical fiber cable guided by the guide means and a mass of solder filling the gap for fixing the tube with said rod. The solder has a third thermal expansion coefficient selected in consideration of the first thermal expansion coefficient and a fusion temperature such as not to substantially affect the predetermined optical characteristic.

BRIEF DESCRIPTION OF THE DRAWING

FIG. 1 is an axial sectional view of a submarine repeater to which conventional feedthrough terminals are attached;

FIG. 2 shows an enlarged axial sectional view of the conventional feedthrough terminal together with a direction of hydraulic pressure;

FIG. 3 is a similar view of a feedthrough terminal according to a preferred embodiment of this invention;

FIG. 4 shows an axial sectional view of a tube used in the feedthrough terminal according to the preferred embodiment illustrated in FIG. 3;

FIG. 5 is a side view of the tube illustrated in FIG. 4;

FIG. 6 is an axial sectional view of a rod used in the feedthrough terminal according to the preferred embodiment illustrated in FIG. 3;

FIG. 7 is a side view of the rod illustrated in FIG. 6;

FIG. 8 is a graphical representation for showing temperature variations of soft solder filled up in a feedthrough terminal according to the preferred embodiment;

FIG. 9 is a graphical representation for showing an optical loss of an optical fiber cable fixed to the feedthrough terminal by the soft solder; and FIG. 10 is an enlarged cross sectional view of a feedthrough terminal according to another embodiment of this invention.

DESCRIPTION OF THE PREFERRED EMBODIMENTS

Referring to FIG. 1, a submarine repeater 10 for use in an optical communication network comprises a pair of conventional feedthrough terminals 11 each of which supports an optical fiber 12 therethrough. A pressure-tight cylinder 14 is terminated by a pair of covers 16 to which the feedthrough terminals 11 are hermetically sealed. A repeater unit 17 is located in the cylinder 14 and is connected to the optical fibers 12.

Referring to FIG. 2, the conventional feedthrough terminal 11 comprises a jacket 18 of copper or copper alloy defining a cylindrical hollow space and a mass 19 of tin-lead solder filled in the cylindrical hollow space. The optical fiber cable 12 is passed through the solder mass 19 with a substantial portion of the fiber cable 12 held by the solder mass 19 in contact therewith. The optical fiber cable 12 usually comprises a core region, a clad region on the core region, and one or more coating layers of synthetic resin on the clad region.

Before the fiber cable 12 is assembled into the feedthrough terminal 11, the coating layers are partially or completely removed from a portion of the optical fiber cable 12 to provide a bared portion. The bared portion substantially serves as the portion to be brought into contact with the solder mass 19 and is coated with one or more metal layers to tightly or closely adhere to the solder mass 19.

The feedthrough terminal 11 should bear high hydraulic pressures applied thereto in a direction indicated by an arrow.

Airtightness and watertightness of the illustrated feedthrough terminal 11 are dependent on quality of the metal layers. The metal layers should, therefore, be formed on the bared portion under strict conditions and with great care to provide desirable airtightness and watertightness as described in the preamble of the instant specification.

Moreover, the feedthrough terminal is defective in that a plurality of optical fiber cables can not be precisely located in the feedthrough terminal, as also pointed out before.

Referring to FIG. 3, a feedthrough terminal 11 according to a preferred embodiment of this invention comprises a tube 21 of a metal, such as phosphor bronze, and a rod 22 of a metal or alloy, such as Kovar comprising, by weight, 29% of nickel, 17% of cobalt, and 54% of iron. The tube metal, namely, phosphor bronze, has a first thermal expansion coefficient of about $1.7 \times 10^{-5}/°C$. while the rod metal, namely, Kovar has a second thermal expansion coefficient of about $5 \times 10^{-6}/°C$. Therefore, the first thermal expansion coefficient is larger than the second one.

As will later be more described in detail, the illustrated feedthrough terminal 11 serves to support a plurality of optical fiber cables 12.

Referring to FIG. 3 again and FIGS. 4 and 5 afresh, the tube 21 has an inside cylindrical surface defining a cylindrical hollow space which is divided into first and second partial spaces. The first partial space has a first diameter $D_1$ and a first length $L_1$ while the second cylindrical space, a second diameter $D_2$ and a second length $L_2$. The first diameter $D_1$ is smaller than the second diameter $D_2$ and the first length $L_1$ is longer than the second length $L_2$. The tube 21 has an outside peripheral surface of an entire diameter. Practically, the first diameter $D_1$, the second diameter $D_2$, and the entire diameter are 6 mm, 7.5 mm, and 15 mm, respectively, while the first and the second lengths $L_1$ and $L_2$, 60 mm and 10 mm, respectively.

Referring to FIG. 3 again and FIGS. 6 and 7 anew, the rod 22 comprises a first rod portion which has an outside cylindrical surface and is snugly received in the cylindrical hollow space, namely, the first partial space with an interface provided by the inside cylindrical surface of the tube 21 and the outside cylindrical surface of the rod 22, as best shown in FIG. 3. The first rod portion has a third length $L_3$ and a third diameter $D_3$.

The illustrated rod 22 comprises a second rod portion which is contiguous to the first rod portion and which has an additional outside cylindrical surface, a fourth length $L_4$, and a fourth diameter $D_4$. The fourth diameter $D_4$ is smaller than the third diameter $D_3$. The additional outside cylindrical surface is placed within the second partial space and opposes a portion of the inside cylindrical surface.

Practically, the third and the fourth lengths $L_3$ and $L_4$ are substantially equal to the first and the second lengths $L_1$ and $L_2$, respectively. The third and the fourth diameters $D_3$ and $D_4$ are 6 mm and 4.5 mm, respectively.

Further referring to FIGS. 6 and 7, a guide member 23 is formed along the interface. The illustrated guide member 23 is for guiding four of the optical fiber cables 12 with a gap left between the additional outside cylindrical surface and the opposing portion of the inside cylindrical surface.

More particularly, the guide member 23 comprises a guide surface defining four substantially equally azimuthally spaced grooves 24 one another, as best shown in FIG. 7. Each of the grooves 24 is extended axially of the rod 22 and recessed from the outside cylindrical surface into the rod 22. Practically, each groove 24 is 0.3 mm deep. The optical fiber cables 12 are guided through the grooves 24 and the gap left between the additional outside cylindrical surface and the opposing portion of the inside cylindrical surface. In other words, a combination of the grooves 24 and the gap serves as the guide member 23.

Turning back to FIG. 3, the optical fiber cables 12 are passed through the feedthrough terminal 11 with portions of the cables 12 guided by the guide member 23 illustrated with reference to FIGS. 4 through 7. As is the case with FIG. 2, a coating layer of each optical fiber cable 12 is partially or completely removed from the guided portion of each optical fiber cable 12 to provide a bared portion. The bared portion is coated with a multilayer of metals, such as tantalum, nickel-chromium (NiCr), copper, and gold.

After the optical fiber cables 12 are positioned in the respective grooves 24 and assembled together with the tube 21, fused soft solder is led into the gap to form a mass 26 of the solder filling the gap. The soft solder has a third thermal expansion coefficient of about $2.5 \times 10^{-5}/°C$. and a fusion temperature of about 183° C. The third thermal expansion coefficient is approximate to the first thermal expansion coefficient (phosphor bronze) and is considerably higher than the second one (Kovar). As a result, the solder contracts as compared with the metal rod 22 when the fused solder is solidified in the gap. Therefore, self-sealing strength takes place within the mass 26 of solder. In addition, the solder mass 26 per se exerts adhesive strength on the multilayer brought into contact with the solder mass 26. Thus, airtightness and watertightness are accomplished by synergy of the self-sealing strength and the adhesive strength of the mass 26.

According to the inventors' experimental studies, it has been confirmed that the self-sealing strength is strong enough to bear the hydraulic pressure of 1000 kgf/cm². It has, therefore, been confirmed that the feedthrough terminal 11 exhibits desirable airtightness and watertightness even when the coating layer of synthetic resin is removed from the optical fiber cables 12 and the metal layer is not applied to the bared portion, as will presently be described. The fusion temperature of the soft solder is considerably lower than a softening temperature of the core and the clad regions of the optical fiber cables 12. Therefore, an optical loss of the cables is scarcely affected by filling up the soft solder.

The fused soft solder may partially flow into the grooves 24 when led into the gap. To the contrary, the fused soft solder flowing into the grooves 24 may be suspended by a sleeve attached to a portion of each optical fiber cable intermediate between the grooves 24 and the gap. It is possible to remove the gap between the additional outside cylindrical surface and the opposing portion of the inside cylindrical surface when the grooves 24 are deep enough to insert each optical fiber cable, with a clearance or gap left around the grooves to fill up soft solder. At any rate, the guide member 23 guides at least one optical fiber cable with a gap left around a portion of the optical fiber cable guided by the guide member 23. The respective optical fiber cables 12 are supported by the feedthrough terminal 11 without any displacement of the optical fiber cables 12. This invention is capable of readily coping with an increase of the optical fiber cables by augmentation of the grooves and is, therefore, convenient to make the feedthrough terminal 11 compact.

Referring to FIGS. 8 and 9, a curve 30 shows an optical loss characteristic of an optical fiber cable measured during a solder filling up and solidifying process. Another curve 31 shows temperature variations of the soft solder during the above-mentioned process. The curves 30 and 31 are drawn on the same scales of time. The optical fiber cable used in the experimental studies was a multimode fiber cable and comprised a core region of 60 microns in diameter, a clad region of 150 microns in diameter, and a coating layer of polyfluorovinylidene. The measurement was carried out by the use of a wavelength band of 0.85 micron.

As readily understood from FIGS. 8 and 9, the optical loss of the optical fiber cable did not substantially vary even when the fiber cable was heated to about 200° C. by filling up fused soft solder and was, thereafter, below the fusion temperature of 183° C. This means that any objectionable stress is not exerted on the optical fiber cable during cooling the fiber cable and the solder.

Various tests were successively carried out as regards first, second, and third optical fiber cables to verify and evaluate airtightness and watertightness of feedthrough terminals according to the preferred embodiment of this invention. The first optical fiber cable had a bared portion from which a coating layer of polyfluorovinylidene was removed and which was coated with a multilayer of metals consisting of tantalum, nickel-chromium, copper, and gold while the second optical fiber had a bared portion failing to be coated with any multilayer of metals. The third optical fiber cable had the multilayer of metals similar to that attached to the first optical fiber and a coating layer of polyfluorovinylidene which was not removed. Each of the first through third optical fiber cables was assembled in the feedthrough terminal to be tested, as shown in FIG. 3.

At first, each of the feedthrough terminals was subjected to a hydraulic test carried out 6 hours under the pressure of 1200 kgf/cm$^2$. Next, a helium leak test was carried out 2 hours under the pressure of 800 kgf/cm$^2$. Thereafter, a temperature cycle test was cyclically applied to each feedthrough terminal two times between −10° C. and 170° C. Subsequently, the above-mentioned hydraulic pressure test and helium leak test were successively made again about each feedthrough terminal.

Table 1 shows results of the tests.

TABLE 1

| Test | Fiber cables | | |
|---|---|---|---|
| | First optical fiber cable | Second optical fiber cable | Third optical fiber cable |
| Hydraulic pressure (1200 kgf/cm$^2$, 6h) | good | good | good |
| He leak (800 kgf/cm$^2$, 2h) | less than $2 \times 10^{-10}$ cc/sec | less than $2 \times 10^{-10}$ cc/sec | less than $2 \times 10^{-10}$ cc/sec |
| Temperature cycle (−10° C.⇌170° C.) | good | good | good |
| Hydraulic pressure (1200 kgf/cm$^2$, 6h) | good | good | good |
| He leak (800 kgf/cm$^2$, 2h) | less than $2 \times 10^{-10}$ cc/sec | less than $2 \times 10^{-10}$ cc/sec | less than $2 \times 10^{-10}$ cc/sec |

As shown in Table 1, the feedthrough terminal according to the preferred embodiment exhibits desirable watertightness and airtightness even when no metal layer is formed on an optical fiber cable and the coating layer is removed from an optical fiber cable.

Referring to FIG. 10, a feedthrough terminal 11 according to another embodiment of this invention comprises a metal tube 21 and a metal rod 22 snugly received in the metal tube 21. As shown in FIG. 7, a guide member is formed on an inside cylindrical surface of the tube 21 and comprises a guide surface defining four notches 33, each of which is extended axially of the tube 21 and recessed from the inside cylindrical surface into the tube 21. The notches 33 are substantially equally azimuthally spaced one another.

While this invention has thus far been described in conjunction with a few embodiments thereof, it is readily possible for those skilled in the art to put this invention into practice in various manners. For example, a guide member may be formed on both of the inside and the outside cylindrical surfaces of the tube 21 and the rod 22. The guide surface defines the grooves shown in FIGS. 6 and 7 and the notches shown in FIG. 7. The notches oppose the respective grooves and each notch is extended axially of the tube 21 and recessed from the inside cylindrical surface into the tube. The feedthrough terminal may be used to guide and support a single optical fiber cable. This feedthrough terminal is applicable not only to a submarine repeater but also to a general repeater or the like.

What is claimed is:

1. A feedthrough terminal for tightly supporting at least one optical fiber cable having a predetermined optical characteristic therethrough, said feedthrough terminal comprising:

a tube of a first metal having an inside cylindrical surface defining a cylindrical hollow space, said first metal having a first thermal expansion coefficient;

a rod of a second metal having an outside cylindrical surface and received snugly in said cylindrical hollow space with an interface provided by said inside and said outside cylindrical surfaces, said second metal having a second thermal expansion coefficient less than said first thermal expansion coefficient;

guide means for guiding said optical fiber cable along said interface with a gap left around at least a portion of the optical fiber cable guided by said guide means; and a mass of solder filling said gap for fixing said tube with said rod, said solder having a third thermal expansion coefficient selected in consideration of said first thermal expansion coefficient and a fusion temperature such as not to substantially affect said predetermined optical characteristic.

2. A feedthrough terminal as claimed in claim 1, wherein said guide means comprises a guide surface defining at least one groove extended axially of said rod and recessed from said outside cylindrical surface into said rod.

3. A feedthrough terminal as claimed in claim 2, wherein said guide surface defines a plurality of substantially equally azimuthally spaced grooves, each being extended axially of said rod and recessed from said outside cylindrical surface into said rod.

4. A feedthrough terminal as claimed in claim 3, wherein said guide surface further defines a plurality of notches opposing the respective grooves, each notch being extended axially of said tube and recessed from said inside cylindrical surface into said tube.

5. A feedthrough terminal as claimed in claim 2, wherein said guide surface defines at least one notch extended axially of said tube and recessed from said inside cylindrical surface into said tube.

6. A feedthrough terminal as claimed in claim 5, wherein said guide surface defines a plurality of substantially equally azimuthally spaced notches, each being extended axially of said tube and recessed from said inside cylindrical surface into said tube.

7. A feedthrough terminal as claimed in any one of claims 2, 3, 4, 5, and 6, wherein said rod comprises a first rod portion having said outside cylindrical surface and a second rod portion contiguous to said first rod portion and having an additional outside cylindrical surface opposing a portion of said inside cylindrical surface, said second rod portion having a smaller diameter than said first rod portion and providing said gap between said additional outside cylindrical surface and the opposing portion of said inside cylindrical surface.

8. A feedthrough terminal as claimed in claim 7, wherein the opposing portion of said inside cylindrical surface has a larger diameter than the remaining portion of said inside cylindrical surface at a portion opposing said additional outside cylindrical surface.

* * * * *